United States Patent
Han et al.

(10) Patent No.: US 11,512,857 B2
(45) Date of Patent: Nov. 29, 2022

(54) COOKING APPLIANCE

(71) Applicant: SAMSUNG ELECTRONICS CO., LTD., Suwon-si (KR)

(72) Inventors: Seungwoo Han, Suwon-si (KR); Sungmin Oh, Suwon-si (KR); Jaehee Jo, Suwon-si (KR); Sangjin Kim, Suwon-si (KR); Junesang Mok, Suwon-si (KR); Changhyun Son, Suwon-si (KR); Minho Yun, Suwon-si (KR); Bokhyun Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 53 days.

(21) Appl. No.: 17/216,875

(22) Filed: Mar. 30, 2021

(65) Prior Publication Data

US 2021/0302028 A1 Sep. 30, 2021

(30) Foreign Application Priority Data

Mar. 31, 2020 (KR) .................. 10-2020-0039453

(51) Int. Cl.
*F24C 15/32* (2006.01)
*F24C 15/00* (2006.01)
(Continued)

(52) U.S. Cl.
CPC .......... *F24C 15/322* (2013.01); *F24C 15/006* (2013.01); *A47J 37/0641* (2013.01);
(Continued)

(58) Field of Classification Search
CPC ....... A47J 37/0641; F24C 3/126; F24C 7/085; F24C 15/006; F24C 15/06; F24C 15/08; F24C 15/2007; F24C 15/32; F24C 15/322
(Continued)

(56) References Cited

U.S. PATENT DOCUMENTS

| D468,159 S | 1/2003 | Becker et al. |
| D468,961 S | 1/2003 | Becker et al. |
| 2008/0184985 A1* | 8/2008 | Hasslberger .......... F24C 15/006 126/21 R |
| 2010/0276413 A1 | 11/2010 | Nam et al. |

(Continued)

FOREIGN PATENT DOCUMENTS

| KR | 20-1998-0016123 | 6/1998 |
| KR | 20-0152112 Y1 | 7/1999 |

(Continued)

OTHER PUBLICATIONS

Translation of KR20090104943 (A) (Year: 2009).*
International Search Report for Application No. PCT/KR/2021-003979 dated Jun. 28, 2021.

*Primary Examiner* — Steven B McAllister
*Assistant Examiner* — Benjamin W Johnson
(74) *Attorney, Agent, or Firm* — Staas & Halsey LLP

(57) ABSTRACT

A cooking appliance includes a main body forming a machine room; a cooking chamber arranged below the machine room; an intermediate flow path including a first suction port and formed between the machine room and the cooking chamber; and a fan configured to suction air into the intermediate flow path, wherein the machine room includes a second suction port through which air is suctioned, and an opening portion connected to the intermediate flow path, the opening portion includes a first opening portion and a second opening portion arranged at a farther distance from the fan than the first opening portion, and the second opening portion has an area larger than an area of the first opening portion.

20 Claims, 15 Drawing Sheets

(51) Int. Cl.
*F24C 15/08* (2006.01)
*F24C 15/20* (2006.01)
*F24C 15/06* (2006.01)
*A47J 37/06* (2006.01)
*F24C 3/12* (2006.01)
*F24C 5/16* (2006.01)
*F24C 7/08* (2006.01)

(52) U.S. Cl.
CPC ............... *F24C 3/126* (2013.01); *F24C 5/16* (2013.01); *F24C 7/085* (2013.01); *F24C 15/06* (2013.01); *F24C 15/08* (2013.01); *F24C 15/2007* (2013.01); *F24C 15/32* (2013.01)

(58) Field of Classification Search
USPC .......................................... 126/21 a
See application file for complete search history.

(56) References Cited

U.S. PATENT DOCUMENTS

| 2015/0369491 | A1* | 12/2015 | Estrella | F24C 15/006 126/21 A |
| 2018/0058702 | A1* | 3/2018 | Jang | F24C 15/322 |
| 2018/0340694 | A1 | 11/2018 | Greenbaum et al. | |
| 2019/0178500 | A1* | 6/2019 | Lee | F24C 7/081 |
| 2019/0223261 | A1 | 7/2019 | Hoffman et al. | |

FOREIGN PATENT DOCUMENTS

| KR | 10-2009-0104943 | 10/2009 |
| KR | 20090104943 A * | 10/2009 |
| KR | 10-2016-0088608 | 7/2016 |
| KR | 10-2020-0010836 | 1/2020 |
| WO | 2018/095661 | 5/2018 |

* cited by examiner

COOKING APPLIANCE

CROSS-REFERENCE TO RELATED APPLICATION

This application is based on and claims priority under 35 U.S.C. § 119 to Korean Patent Application No. 10-2020-0039453, filed on Mar. 31, 2020 in the Korean Intellectual Property Office, the disclosure of which is incorporated herein by reference.

BACKGROUND

1. Field

The disclosure relates to a cooking appliance, and more specifically, to a cooking appliance with an improved structure.

2. Description of the Related Art

In general, a cooking appliance is a household appliance equipped with a cooking chamber, a heating device for applying heat to the cooking chamber, and a circulation device for circulating heat generated by the heating device in the cooking chamber and cooks food.

As a device for cooking by heating food in a sealed state, the cooking appliance may be classified into an electric type cooking appliance, a gas type cooking appliance, and an electronic type cooking appliance according to a heating source of the heating device.

For example, an electric oven may use an electric heater as a heating source, a gas oven may use heat generated by gas as a heating source, and a microwave oven may use frictional heat of water molecules due to high frequency as a heating source.

The cooking appliance may be provided with a control panel at one of front and upper surfaces of a main body. The control panel may be provided with a number of buttons, a keypad, a knobs, etc. configured to set a cooking mode desired by a user or set various conditions required for cooking. In addition, in order to improve the design, the cooking appliance may include a knob holder surrounding the knob, and may include a glass panel forming the front surface of the control panel.

SUMMARY

According to an aspect of the disclosure, there is provided a cooking appliance including: a main body forming a machine room; a cooking chamber arranged below the machine room; an intermediate flow path including a first suction port and formed between the machine room and the cooking chamber; and a fan configured to suction air into the intermediate flow path, wherein the machine room includes a second suction port through which air is suctioned, and an opening portion connected to the intermediate flow path, the opening portion includes a first opening portion and a second opening portion arranged at a farther distance from the fan than the first opening portion, and the second opening portion has an area larger than an area of the first opening portion.

Air introduced into the machine room through the second suction port may be provided to flow into the intermediate flow path through the first opening portion and the second opening portion.

The cooking appliance may further include a partition plate configured to divide the machine room from the intermediate flow path in an upper side and lower side direction, wherein the first opening portion and the second opening portion may be formed in the partition plate.

The partition plate may have an upper surface that forms a lower portion of the machine room and have a lower surface that forms an upper portion of the intermediate flow path.

A flow area of air in the intermediate flow path may be provided to increase and decrease in a second direction perpendicular to a first direction in which the first suction port is opened, and the second opening portion may be formed on a region in which the flow area of air in the intermediate flow path decreases along the first direction.

The first opening portion may be formed on a region in which the flow area of air in the intermediate flow path is constant along the first direction.

The fan may be arranged on the region in which the flow area of air in the intermediate flow path is constant along the first direction.

The intermediate flow path may include a first region and a second region partitioned from each other in a second direction perpendicular to a first direction in which the first suction port is opened, a flow area of air in the first region may be provided to be larger than a flow area of air in the second region, and the fan may be arranged on the first region.

The first opening portion may be arranged on the first region, and the second opening portion may be arranged on the second region.

The flow area of air in the second region may be provided to increase and increase in the second direction.

The first region and the second region may be divided with respect to a center of the intermediate flow path, and an inclination angle of a sidewall of the first region forming the first region with respect to the first direction may be smaller than an inclination angle of a sidewall of the second region forming the second region with respect to the first direction.

The first suction port may have a suction area larger than a suction area of the second suction port.

The cooking appliance may further include an upper side cooking portion arranged above the machine room, wherein the upper side cooking portion may include a cooking surface on which a cooking object is cooked and a heating device arranged in the machine room, and the first and second opening portions may be arranged such that heat generated from the heating device is provided to flow out of the machine room together with air suctioned through the second suction port.

The cooking appliance may further include a discharge port that is open upward to discharge air moved by the fan and a discharge cover that covers the discharge port, and an upper surface of the discharge cover may be arranged in parallel with the cooking surface.

The discharge cover may include a first through hole and a second through hole through which air discharged from the discharge port passes upward, an intermediate portion formed between the first and second through holes, and a discharge guide arranged below the intermediate portion to guide air to the first and second through holes.

The discharge cover may include a rear surface extending downward from a rear end of the upper surface and an additional through hole arranged in the rear surface and formed to allow air discharged from the discharge port to pass therethrough.

According to another aspect of the disclosure, there is provided a cooking appliance including: a main body forming a machine room having a first suction port; a cooking chamber arranged below the machine room; an intermediate flow path including a second suction portion and formed between the machine room and the cooking chamber; and a partition plate configured to divide the intermediate flow path from the machine room, wherein the partition plate includes an opening portion provided to communicate the machine room with the intermediate flow path, the opening portion includes a first opening portion and a second opening portion arranged at a farther distance from the fan than the first opening portion, and the second opening portion has an area larger than an area of the first opening portion.

The cooking appliance may further include a fan arranged on the intermediate flow path and configured to suction air into the intermediate flow path.

A flow area of air in the intermediate flow path may be provided to increase or decrease in a second direction perpendicular to a first direction in which the first suction port is opened, and the second opening portion may be formed on a region in which the flow area of air in the intermediate flow path decreases along the first direction.

The first opening portion may be formed on a region in which the flow area of air in the intermediate flow path is constant along the first direction.

According to another aspect of the disclosure, there is provided a cooking appliance including: a main body forming a machine room; a cooking chamber arranged below the machine room; an intermediate flow path including a first suction portion and formed between the machine room and the cooking chamber; and a fan configured to suction air into the intermediate flow path, wherein the machine room includes a second suction portion through which air is suctioned and an opening portion connected to the intermediate flow path, the intermediate flow path includes a first region and a second region partitioned from each other in a second direction perpendicular to a first direction in which the first suction port is opened, a flow area of air in the first region is provided to be larger than a flow area of air in the second region, the opening portion includes a first opening portion arranged on the first region and a second opening portion arranged on the second region, and the second opening portion has an area larger than an area of the first opening portion.

Additional aspects of the disclosure will be set forth in part in the description which follows and, in part, will be obvious from the description, or may be learned by practice of the disclosure.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
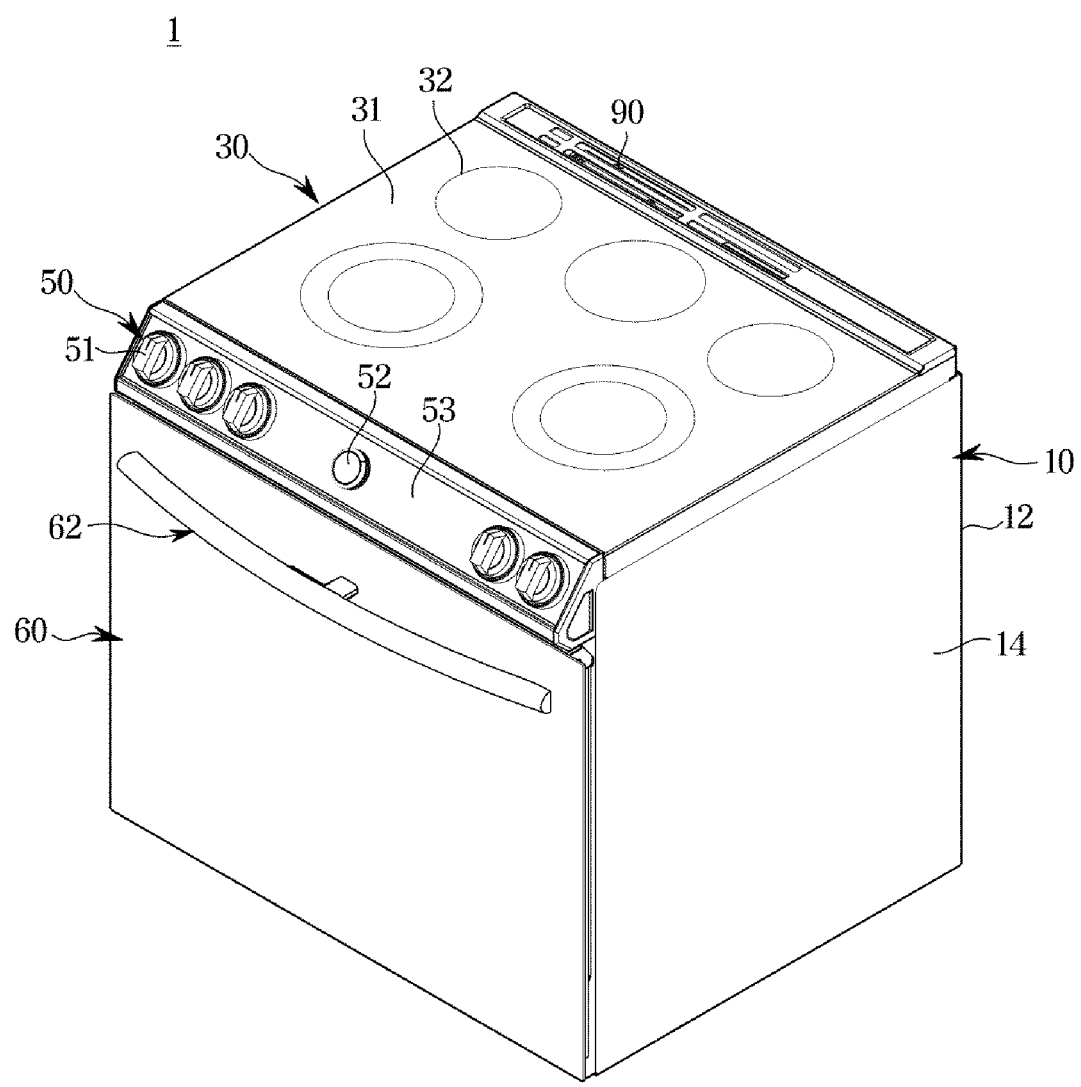
FIG. 1 is a view illustrating a cooking appliance according to an embodiment of the disclosure.

The embodiments set forth herein and illustrated in the configuration of the disclosure are only the most preferred embodiments and are not representative of the full the technical spirit of the disclosure, so it should be understood that they may be replaced with various equivalents and modifications at the time of the disclosure.

Throughout the drawings, like reference numerals refer to like parts or components.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the disclosure. Descriptions shall be understood as to include any and all combinations of one or more of the associated listed items when the items are described by using the conjunctive term "~ and/or ~," or the like.

The terms "front", "rear", "upper", "lower", "top", and "bottom" as herein used are defined with respect to the drawings, but the terms may not restrict the shape and position of the respective components.

Therefore, it is an aspect of the disclosure to provide a cooking appliance capable of efficiently cooling electric components on an upper portion of a case.

It is another aspect of the disclosure to provide a cooking appliance having an improved design.

It is another aspect of the disclosure to provide a cooking appliance that includes a cooking chamber with an increased stiffness.

Hereinafter, embodiments of the disclosure will be described in detail with reference to the accompanying drawings.

Figure 2:
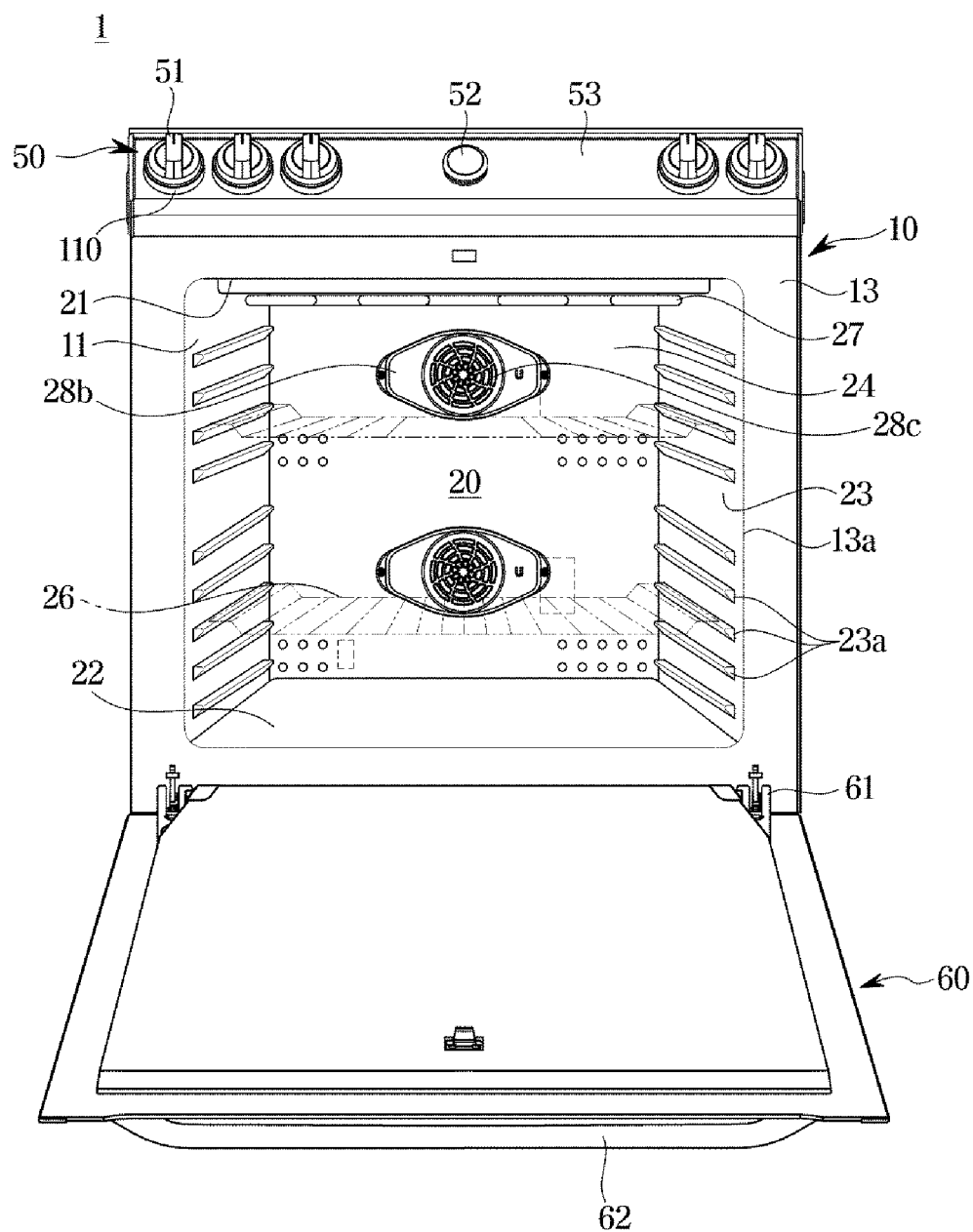
FIG. 2 is a view illustrating a state of the cooking appliance shown in FIG. 1 in which a door is open.
Figure 3:
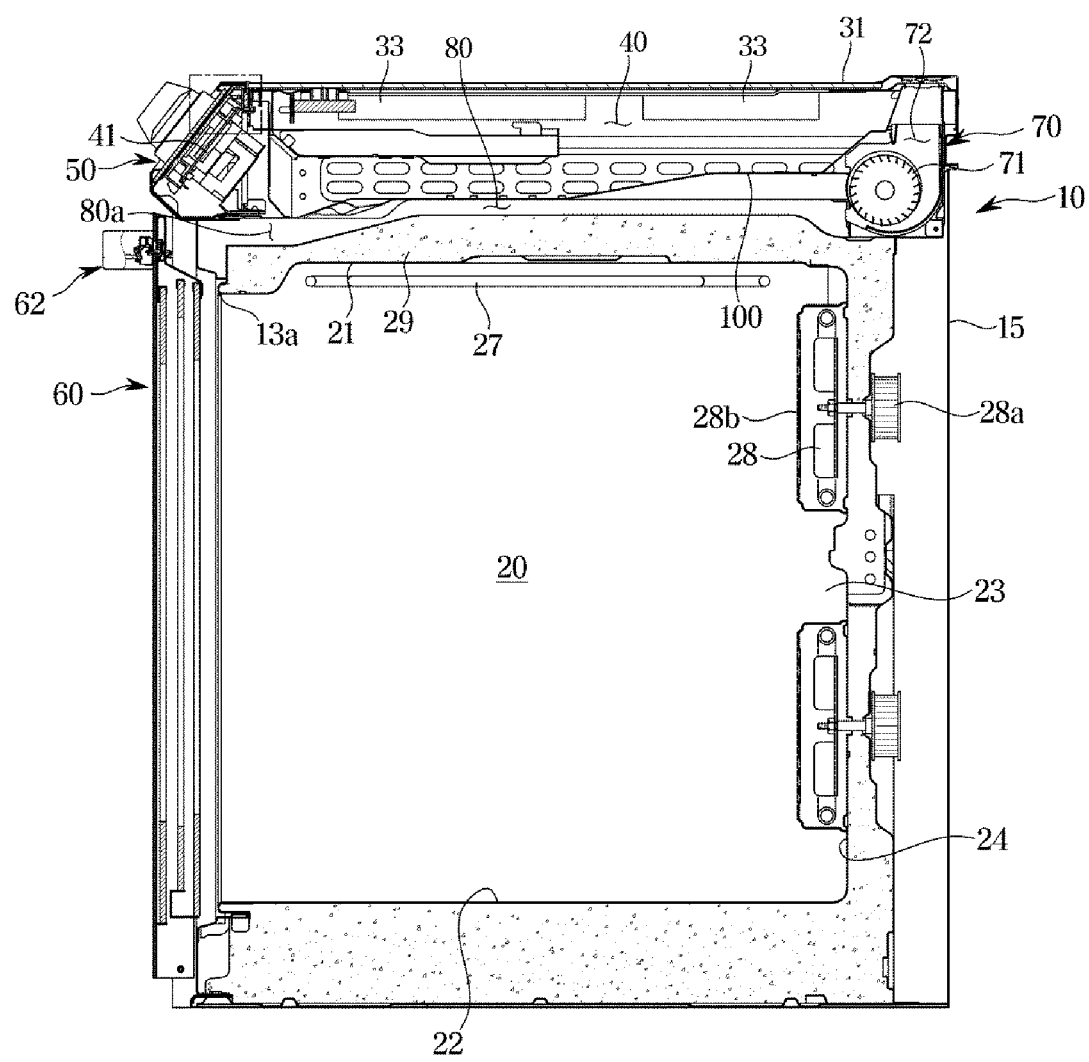
FIG. 3 is a side cross-sectional view illustrating the cooking appliance shown in FIG. 1.

FIG. 1 is a view illustrating a cooking appliance according to an embodiment of the disclosure. FIG. 2 is a view illustrating a state of the cooking appliance shown in FIG. 1 in which a door is open. FIG. 3 is a side cross-sectional view illustrating the cooking appliance shown in FIG. 1.

A cooking appliance 1 according to an embodiment of the disclosure will be described with reference to FIGS. 1 to 3.

Referring to FIGS. 1 to 3, the cooking appliance 1 may include a main body 10 including an inner case 11 in which a cooking chamber 20 is formed and an outer case 12 coupled to the outside of the inner case 11 to form the external appearance of the cooking appliance 1.

The inner case 11 and the outer case 12 may each have a substantially box shape with an open front.

The outer case 12 may include a front panel 13 forming the front surface of the main body 10, a side panel 14 forming the side surface of the main body 10, and a rear panel 15 forming the rear surface of the main body 10.

The front panel 13 may be formed with a main body opening 13a, and the main body opening 13a may allow a front surface of the cooking chamber 20 provided inside the main body 10 to be opened. The front panel 13 may be provided at a front upper portion thereof with a control panel 50 that covers a front surface of a machine room 40.

The cooking chamber 20 may be formed by a top plate 21, a bottom plate 22, both side plates 23 and a rear plate 24. The cooking chamber 20 is a cooking space that has a front surface openable through the opening of the front panel 13 so that food may be put in and out.

The both side plates 23 may be provided with a plurality of supports 23a formed on inner surfaces thereof. At least one detachable rack 26 on which food may be placed may be mounted on the plurality of supports 23a.

Rails (not shown) may be installed on the plurality of supports 23a so that the rack 26 is slidable. A user may move the rack 26 through the rail (not shown) to take out or place food.

A divider (not shown) capable of dividing the cooking chamber 20 into a plurality of cooking chambers may be detachably mounted on the plurality of supports 23a. The plurality of cooking chambers 20 divided by the divider do not need to have the same size, and each size may be different from each other.

With such a configuration, the user may utilize the divided spaces of the plurality of cooking chamber 20 in various uses according to the intention. The divider may be formed of an insulating material to insulate each cooking chamber 20.

The cooking chamber 20 may be provided with a first heating device 27 for heating food, and the first heating device 27 may be provided as a heater. In detail, the first heating device 27 may be an electric heater including an electric resistor. However, the disclosure is not limited thereto, and the first heating device 27 may be a gas heater that generates heat by burning gas. Accordingly, the cooking appliance 1 may include an electric oven and a gas oven.

The rear plate 24 of the cooking chamber 20 may be provided with a circulation fan 28 that circulates air in the cooking chamber 20 so that food is evenly heated, and a circulation motor 28a that drives the circulation fan 28.

The circulation fan 28 may be provided on a front side thereof with a fan cover 28b that covers the circulation fan 28, and the fan cover 28b may be formed with a cover opening 28c formed to allow air to flow therethrough.

Electric components for driving the cooking appliance 1 may be disposed in the machine room 40. The machine room 40 may be disposed above the cooking chamber 20.

A heat insulating material 29 that insulates the machine room 40 and the cooking chamber 20 may be provided between the machine room 40 and the cooking chamber 20 to prevent heat from the cooking chamber 20 from being transmitted to the machine room 40. The heat insulating material 29 may not only cover a region between the machine room 40 and the cooking chamber 20, but also entirely cover the outer side of the cooking chamber 20 so that heat from the cooking chamber 20 is not transmitted to the outside of the cooking appliance 1.

The open front of the cooking chamber 20 is opened and closed by a door 60, and the door 60 may be coupled to the main body 10 by a hinge 61 provided at a lower portion the main body 10 so as to be rotated with respect to the main body 10. The door 60 rotatably coupled to the front surface of the main body 10 to open and close the cooking chamber 20 may be formed of a plurality of glasses.

A handle 62 to be gripped by a user may be provided on a front upper portion of the door 60 to open and close the cooking chamber 20 by the door 60.

The cooking appliance 1 may include a cooktop 30 provided on the upper portion of the cooking appliance 1 to heat a container containing food and placed thereon. The cooktop 30 may include a cooking surface 31 horizontally formed on an upper side of the cooktop 30.

At least one heating portion 32 may be provided on the cooking surface 31. The container containing the cooking object may be placed in the heating portion 32 to thereby be directly heated.

The cooktop 30 may include a second heating device 33 disposed below the cooking surface 31 and providing heat to the heating portion 32. The second heating device 33 may be provided corresponding in number to the number of the heating portions 32.

The second heating device 33 may be disposed inside the machine room 40 below the cooktop 30.

The second heating device 33 may be provided as a heater. In detail, the second heating device 33 may be an electric heater including an electric resistor. However, the disclosure is not limited thereto, and the cooktop 30 may be provided as an induction range, and in this case, the second heating device 33 may be provided as a high frequency induction heating device.

The control panel 50 may be configured to control the first and second heating devices 27 and 33. The control panel 50 may be disposed on at least a portion of the main body 10. According to an embodiment of the disclosure, the control panel 50 may be disposed on the upper end of the front surface of the main body 10. However, the disclosure is not limited thereto, and the control panel 50 may be disposed on the upper surface of the main body 10 or may form one surface of the main body 10.

The control panel 50 may include an exterior panel 53 forming the external appearance thereof. The exterior panel 53 may be formed of a glass material, but is not limited thereto.

The control panel 50 may include a knob 51 capable of operating the cooking appliance 1. The knob 51 may be configured to operate the cooktop 30. The knobs 51 may be provided corresponding in number to the number of heating portions 32 of the cooktop 30.

The control panel 50 may include an input device 52 capable of operating the cooking appliance 1. The input device 52 may be configured to operate the heater 27 of the cooking chamber 20. According to an embodiment of the disclosure, the input device 52 may be provided as a type that operates by being rotated, similar to the knob 51. Alternatively, the input device 52 may be provided as a button type input device that operates by being pressed, and as a touch screen type input device.

A display module (not shown) may be mounted on the control panel 50. The display module may be provided to enable a touch input.

The knob 51, the input device 52, and the display module (not shown) may be disposed on the exterior panel 53.

The machine room 40 may have a temperature rise by heat from various electric components (electric components except for a component denoted by a reference numeral 41 are omitted in the drawing) accommodated therein or from the second heating device 33, or may receive heat directly transferred from the cooking chamber 20. Accordingly, the cooking appliance 1 may include a blower device 70 capable of cooling the machine room 40 by circulating air around the machine room 40 and an intermediate flow path 80 formed to allow external air introduced through the blower device 70 to move therethrough.

The intermediate flow path 80 may be formed between the machine room 40 and the cooking chamber 20. Accordingly, heat generated in the cooking chamber 20 is prevented from being transferred to the machine room 40.

The blower device 70 may be disposed on the intermediate flow path 80 to circulate external air. Accordingly, heat generated in the cooking chamber 20 is provided to flow together with the external air circulating in the intermediate flow path 80 and prevented flowing to the machine room 40.

The intermediate flow path 80 may include a first suction port 80*a* formed at the front end thereof. The blower device 70 may be disposed at the rear end of the intermediate flow path 80. As the blower device 70 is driven, external air is caused to flow into the intermediate flow path 80 through the first suction port 80*a* and then flows into the blower device 70 along the intermediate flow path 80 to the outside of the cooking appliance 1.

The first suction port 80*a* may be disposed between the upper end of the door 60 and the lower end of the machine room 40.

The machine room 40 may include a second suction port 55 provided to circulate the air inside the machine room 40 to prevent the temperature of the electric component 41 from rising by the heat generated inside the machine room 40. The technical characteristics of air flow inside the machine room 40 will be described in detail below.

The blower device 70 may include a blower fan 71 that causes air to flow. The second suction port 55 may be disposed on the control panel 50.

The outside air introduced through the second suction port 55 may cool the electric components 41 of the machine room 40 and flow into the intermediate flow path 80 and then into the blower device 70 along the intermediate flow path 80.

With such a configuration, the cooking appliance 1 according to the embodiment of the disclosure may efficiently cool the electric components 41 of the machine room 40.

The blower fan 71 may suction air in the axial direction and discharge the suctioned air in the radial direction. That is, the blower fan 71 according to the disclosure may be a centrifugal fan. Alternatively, the blower fan 71 may include an axial fan.

The blower device 70 may include a discharge port 72 through which air introduced by the blower fan 71 is discharged.

The discharge port 72 may be provided to be opened upward of the cooking appliance 1. Accordingly, the outside air introduced through first and second suction ports 81 and 55 flows into the intermediate flow path 80 or the machine room 40 to thereby be mixed on the intermediate flow path 80 and discharged outside of the cooking appliance 1 through the discharge port 72.

Hereinafter, technical characteristics of outside air circulating inside the cooking appliance 1 through the machine room 40 and the intermediate flow path 80 will be described in detail.

Figure 4:
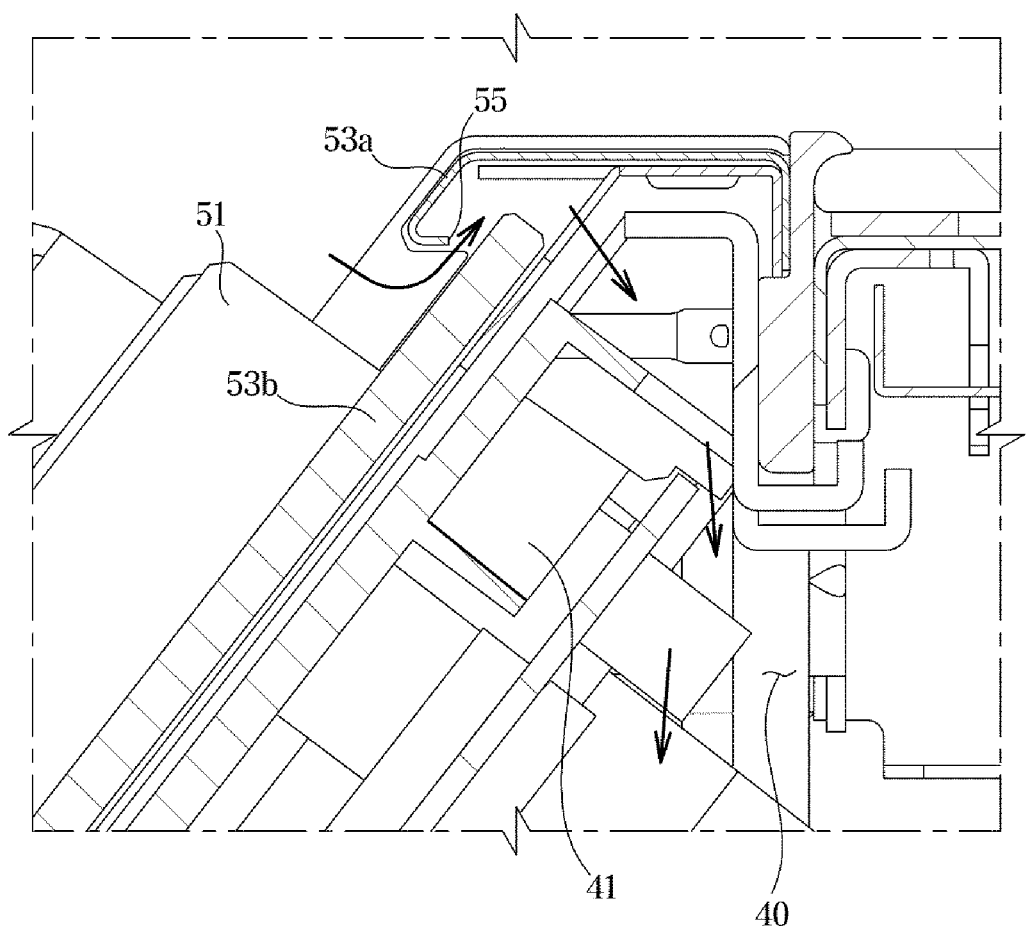
FIG. 4 is an enlarged view showing a portion of FIG. 3.
Figure 5:
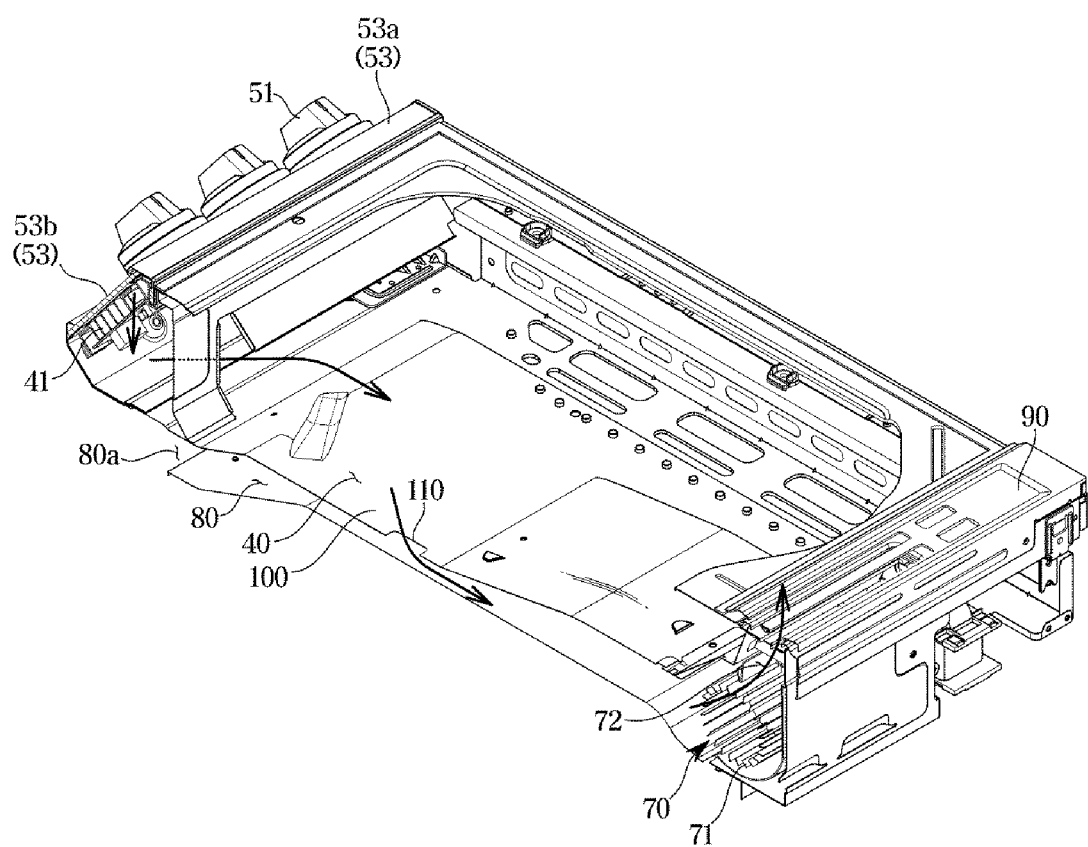
FIG. 5 is a cross-sectional perspective view illustrating a machine room and an intermediate flow path shown in FIG. 3.

FIG. 4 is an enlarged view showing a portion of FIG. 3, and FIG. 5 is a cross-sectional perspective view illustrating the machine room and the intermediate flow path shown in FIG. 3.

The second suction port 55 may be formed at an approximately central portion along the length direction of the control panel 50. The second suction port 55 may be located at an upper side of the input device 52.

The second suction port 55 may be formed on a cutout region formed on the exterior panel 53. In detail, the exterior panel 53 may be formed by assembling an upper exterior panel 53*a* to a front exterior panel 53*b*, and the second suction port 55 may be formed at a separation between the upper exterior panel 53*a* and the front exterior panel 53*b*.

The second suction port 55 may be positioned to correspond to the electric component 41 mounted on the control panel 50. Accordingly, air introduced through the second suction port 55 may efficiently cool the electric component 41.

The second suction port 55 may be formed to face in the direction of gravity. The second suction port 55 may be formed to face downward. Accordingly, the inlet may be provided without being exposed to the user.

As the blower fan 71 of the blower device 70 is operated, air introduced through the second suction port 55 may be introduced into the machine room 40. The air introduced into the machine room 40, while flowing along the direction of gravity, performs heat exchanges with the electric component 41 mounted on the control panel 50 to thereby easily cool the electric component 41. Air introduced into the machine room 40 may cool the electric components 41 adjacent to the control panel 50.

However, the disclosure is not limited thereto, and the second suction port 55 may be formed in another portion of the control panel 50 or may be disposed at one side of the front part of the machine room 40 rather than on the control panel 50.

In addition, although not shown in the drawings, the second suction port 55 may cool the electric components 41 while heat-exchanging with other various electric components (not shown) arranged inside the machine room 40.

In addition, heat generated from the second heating device (33 in FIG. 3) arranged inside the machine room 40 may be moved by the outside air introduced through the second suction port 55 and thus the heat generated from the second heating device 33 may be prevented from being transferred to the electric components 41 adjacent to the control panel 50 and other various electric components (not shown).

The cooking appliance 1 may include a partition plate 100 that divides the machine room 40 from the intermediate flow path 80 in the upper side and lower side direction.

The upper surface of the partition plate 100 may form a lower portion of the machine room 40, and the lower surface of the partition plate 100 may form an upper portion of the intermediate flow path 80. The partition plate 100 may form parts of each of the machine room 40 and the intermediate flow path 80.

Accordingly, the partition plate 100 may be considered as a part of the machine room 40 or a part of the intermediate flow path 80.

The partition plate 100 may include an opening portion 110 through which external air suctioned from the second suction port 55 flows into the intermediate flow path 80.

The opening portion 110 may be provided to communicate the machine room 40 with the intermediate flow path 80. An intake airflow generated from the blower device 70 may be transmitted to the machine room 40 through the opening portion 110.

Since the machine room 40 is not separately provided with a blower fan for suctioning air to introduce outside air from the second suction port 55, the intake airflow generated from the blower device 70 may be moved through the opening portion 110 into the machine room 40 so that air may be suctioned through the second suction port 55.

The air suctioned through the second suction port 55 may flow into the machine room 40 and perform heat exchange with the electric component 41 and then flow into the intermediate flow path 80 through the opening portion 110.

The air flowing to the intermediate flow path 80 may be moved together with air suctioned through the first suction port 80a and discharged to the outside of the cooking appliance 1 through the blower device 70.

Hereinafter, the opening portion 110 of the partition plate 100 will be described in detail.

Figure 6:
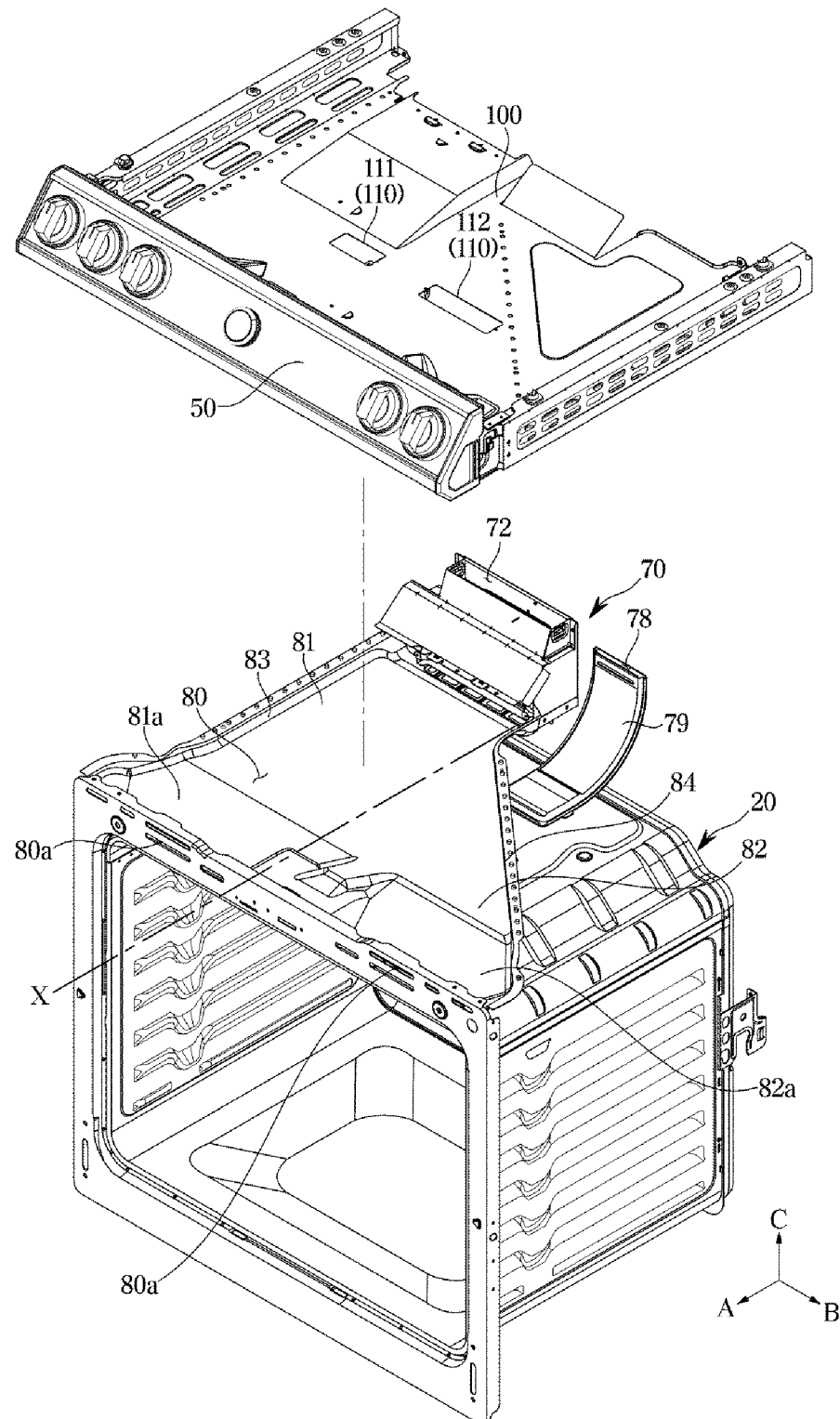
FIG. 6 is an exploded perspective view illustrating some components of the cooking appliance according to an embodiment of the disclosure.
Figure 7:
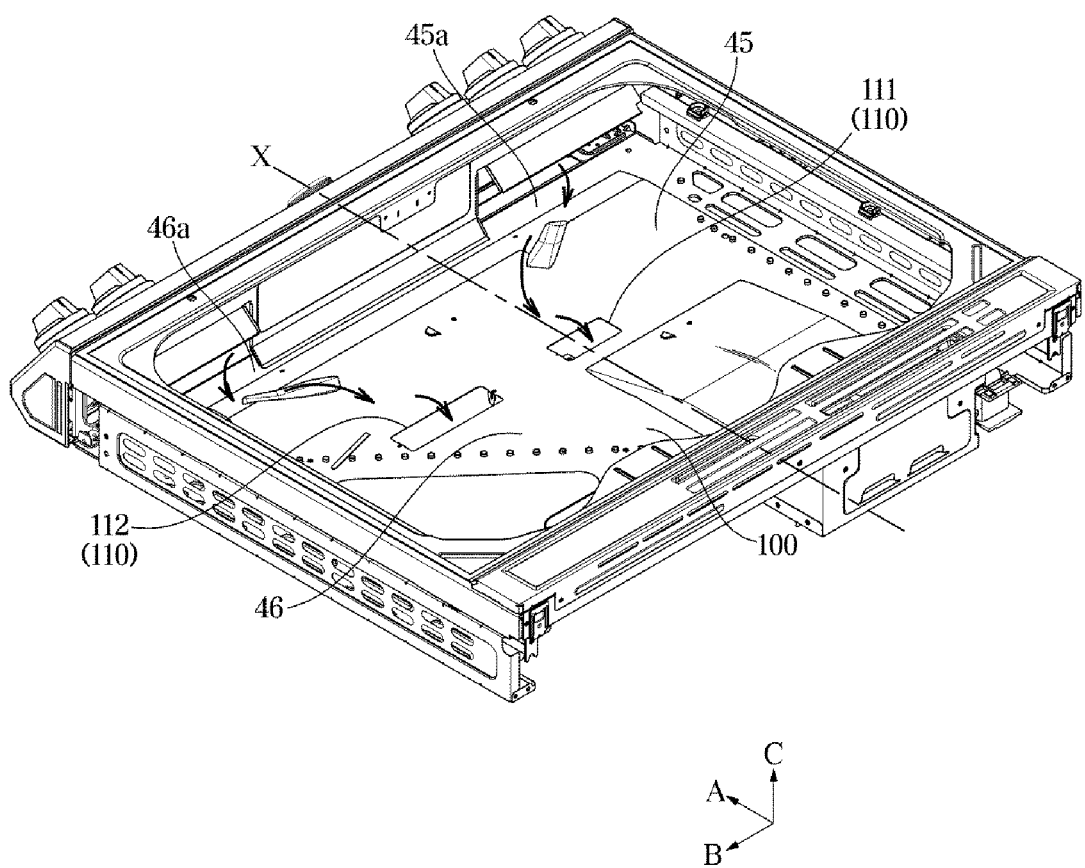
FIG. 7 is a perspective view illustrating an interior of the machine room of the cooking appliance according to the embodiment of the disclosure.

FIG. 6 is an exploded perspective view illustrating some components of the cooking appliance according to the embodiment of the disclosure, and FIG. 7 is a perspective view illustrating the interior of the machine room of the cooking appliance according to the embodiment of the disclosure.

As described above, the intermediate flow path 80 may be disposed above the cooking chamber 20 and below the machine room 40.

On the upper side of the cooking chamber 20, electric components (not shown) and the like electrically connected to components disposed inside the cooking chamber 20 may be disposed. Accordingly, the intermediate flow path 80 may extend in a laterally asymmetrical shape in a front side and rear side direction.

In detail, when a forward direction, that is, a direction in which the first suction port 80a of the intermediate flow path 80 is opened is referred to as a first direction A, and a left side and right side direction perpendicular to the first direction A is referred to as a second direction B, the intermediate flow path 80 may be formed asymmetrically with respect to a center X in the second direction B when viewed from the center X in the second direction B inside the intermediate flow path 80.

This is because the intermediate flow path 80 may not be formed in the entire area on the upper side the cooking chamber 20 due to the components of the cooking appliance 1 disposed on the upper side the cooking chamber 20 as described above.

According to the embodiment of the disclosure, since the cooking chamber 20 is provided at the upper side thereof with a cooking chamber discharge flow path 79 including a cooking chamber discharge port 78 through which air inside the cooking chamber 20 is discharged, the intermediate flow path 80 is formed asymmetrically with respect to the center X in the second direction B.

Since the cooking chamber discharge flow path 79 is disposed at one side of the upper portion of the cooking chamber 20 in the second direction B, the intermediate flow path 80 may be formed to extend in the first direction A so as not to overlap the position where the cooking chamber discharge flow path 79 is disposed.

Accordingly, the flow area of air in the intermediate flow path 80, that is, the area inside the intermediate flow path 80 in the first direction may be provided to increase or decrease in the second direction. That is, the intermediate flow path 80 is provided to extend from a front end in the first direction A at which the first suction port 80a is formed to a rear end in the first direction A at which the blower device 70 is disposed, and the flow area of air inside the intermediate flow path 80 increases or decreases in the second direction B as the intermediate flow path 80 extends in the first direction A.

The flow area of air inside the intermediate flow path 80 at the front end in the first direction A may be larger than the flow area of air inside the intermediate flow path 80 at the rear end in the first direction A.

In an implementation, the flow area of air inside the intermediate flow path 80 may gradually decrease from the front end to the rear end in the first direction A.

In this case, the flow area of air inside the intermediate flow path 80 may decrease in an asymmetrical manner in the second direction B with respect to the center X in the second direction B.

Assuming that the inner space of the intermediate flow path 80 is divided based on the center X in the second direction B, the intermediate flow path 80 may include a first region 81 and a second region 82 arranged at one side and the opposite side with respect to the center X in the second direction B.

The first suction ports 80a communicating with the outside may be disposed at a front end of the first region 81 and a front end of the second region 82, respectively. Outside air introduced from the first suction ports 80a may pass through the first region 81 and the second region 82 into the blower device 70.

In this case, the total flow area of air in the first region 81 may be provided to be larger than the total flow area of air in the second region 82. This is because the cooking chamber discharge flow path 79 is disposed at a position corresponding to the second region 82 when viewed in the first direction A as described above, the second region 82 has a reduced area in the second direction B.

In addition, the blower device 70 may be disposed on the first region 81. This is because, when viewed in the first direction A, the upper side of the cooking chamber 20 in the first region 81 does not have auxiliary components, the blower device 70 may be easily disposed on the first region 81.

However, the disclosure is not limited thereto, and when auxiliary components are disposed on the upper side of the cooking chamber 20 in a region corresponding to the first region 81 when viewed in the first direction A, the blower device 70 may be disposed on the second region 82, and the total flow area of air in the first region 81 may be provided to be smaller than the total flow area of air in the second region 82.

In other words, the sizes of the total flow areas of air in the first region 81 and the second region 82 and the location where the blower device 80 is disposed may vary depending on the arrangement of components on the upper side of the cooking chamber 20.

The first region 81 may be provided to have a constant flow area of air in the intermediate flow path 80 in the first direction A.

The second region 82 may be provided to have a flow area of air inside the intermediate flow path 80 in the first direction A that decreases as being directed toward the rear end in the first direction A.

The intermediate flow path 80 may include a first wall 83 forming one side of the first region 81 and a second wall 84 forming one side of the second region 82. The first wall 83 and the second wall 84 may be provided to extend in the first direction A.

The inclination angle of the first wall 83 with respect to the first direction A may be provided to be smaller than the inclination angle of the second wall 84 with respect to the first direction A. Accordingly, the flow area of air inside the second region 82 may be provided to be smaller than the flow area of air inside the first region 81.

As described above, since the second region 82 is provided to have a cross-sectional area that decreases toward the rear side in the first direction A, the blower device 70 may be disposed at the rear end of the first region 81.

Accordingly, the distance between a front part 81a of the first region 81 and the blower device 70 may be formed shorter than the distance between a front part 82a of the second region 82 and the blower device 70.

The inner space of the machine room 40 may also include a first region 81 and a second region 82 arranged at positions corresponding in a third direction C to the first region 81 and the second region 82, in which the third direction C is an upper side and lower side direction perpendicular to the first direction A and the second direction B.

The first region 81 and the second region 82 of the machine room 40 may be provided to suction air from the second suction ports 55 respectively formed at the front sides thereof, and the air flowing in the respective regions 45 and 46 may be discharged to the intermediate flow path 80 through the opening portions 110.

The opening portion 110 includes a first opening portion 111 disposed in the first region 81 of the machine room 40 and a second opening portion 112 disposed in the second region 82 of the machine room 40.

The first opening portion 111 and the second opening portion 112 may be formed in the partition plate 100. The first opening portion 111 may be disposed at one side with respect to the center X in the second direction B, and the second opening portion 112 may be disposed at the opposite side with respect to the center X in the second direction B.

The first opening portion 111 may be disposed at a position corresponding in the third direction C to the first region 81 of the intermediate flow path 80. The second opening portion 112 may be disposed at a position corresponding in the third direction C to the second region 82 of the intermediate flow path 80.

Accordingly, the first opening portion 111 may be provided to allow the first region 81 of the machine room 40 and the first region 81 of the intermediate flow path 80 to communicate with each other in the third direction C. In addition, the second opening portion 112 may be provided to allow the second region 82 of the machine room 40 and the second region 82 of the intermediate flow path 80 to communicate with each other in the third direction C.

Air introduced through the second suction port 55 disposed at the front of the first region 81 of the machine room 40 flows into the first region 81 of the machine room 40, and then through the first opening portion 111, flows into the first region 81 of the intermediate flow path 80, flowing outside of the cooking appliance 1 through the blower device 70.

Air introduced through the second suction port 55 disposed at the front of the second region 82 of the machine room 40 flows into the second region 82 of the machine room 40, and then through the second opening portion 112, flows into the second region 82 of the intermediate flow path 80, flowing outside of the cooking appliance 1 through the blower device 70.

As described above, the distance between the front part 81a of the first region 81 and the blower device 70 is shorter than the distance between the front part 82a of the second region 82 and the blower device 70.

Accordingly, the distance between a front part 45a of the first flow path 45 of the machine room 40 corresponding in the third direction C to the front part 81a of the first region 81 of the intermediate flow path 80 and the blower device 70 may be shorter than the distance between a front part 46a of the second flow path 46 of the machine room 40 corresponding in the third direction C to the front part 82a of the second region 82 of the intermediate flow path 80 and the blower device 70.

Accordingly, the suction force delivered to the air flowing at the front part 46a of the second flow path 46 of the machine room 40 may be smaller than the suction force delivered to the air flowing at the front part 45a of the first flow path 45 of the machine room 40.

That is, the air pressure on the front part 45a of the first flow path 45 of the machine room 40 and the air pressure on the front part 46a of the second flow path 46 of the machine room 40 are different from each other. As a result, the intake airflow of air is unevenly generated, which cause imbalance in the cooling of inside of the machine room 40.

The amount of air heat-exchanged with electric components (not shown) disposed on the front part 46a of the second flow path 46 of the machine room 40 is less than the amount of air heat-exchanged with electric components (not shown) disposed on the front part 45a of the first flow path 45 of the machine room 40, so that the cooling efficiency of the electric components (not shown) disposed on the front part 46a of the second flow path 46 of the machine room 40 is lower than the cooling efficiency of the electric components (not shown) disposed on the front part 45a of the first flow path 45 of the machine room 40, so that the electric components (not shown) disposed on the front part 46a of the second flow path 46 may be damaged.

Accordingly, a larger amount of intake airflow needs to be transmitted to the front part 46a of the second flow path 46 of the machine room 40 than that transmitted to the front part 45a of the first flow path 45.

Therefore, the area of the second opening portion 112 formed in the second flow path 46 of the machine room 40 may be provided to be larger than the area of the first opening portion 111 formed in the first flow path 45.

As the area of the second opening portion 112 is formed to be larger, the amount of intake airflow supplied to the front part 46a of the second flow path 46 of the machine room 40 increases, and the air pressure in the front part 45a of the first flow path 45 and the air pressure in the front part 46a of the second flow path 46 of the machine room 40 are compensated for each other, so that cooling efficiency in the second direction B is balanced.

That is, the intermediate flow path 80 having an irregular structure in the second direction B may cause an imbalance in flow velocity between some regions 45 and 46 inside the machine room 40 disposed at positions corresponding in the third direction C to the intermediate flow path 80, so that cooling may be performed unevenly.

However, according to the embodiment of the disclosure, in order to compensate for the imbalance of the flow velocity between the regions 45 and 46 inside the machine room 40, the opening portions 110 communicating with the machine room 40 are formed in an asymmetric manner in the second direction B, and the asymmetrical opening portions 110 may adjust the flow velocities of the regions 45 and 46 inside the machine room 40 to be uniform, so that the cooling efficiency in the second direction B inside the machine room 40 may be kept constant.

The opening portion 110 may be disposed so that heat generated by the second heating device 33 flows out of the machine room 40 together with air suctioned through the second suction port 55.

That is, the opening portion 110 may be provided so as not to be disposed further away from the second suction port 55 in the first direction A than the second heating device 33 is disposed away from the second suction port 55

Such a configuration is provided because when the opening portion 110 is disposed excessively far away from the second suction port 55 in the first direction A compared to the second heating device 33, heat generated from the second heating device 33 may be directly transferred to the electric components (not shown) disposed in the machine room 40 rather than being moved to the opening portion 111 by the air introduced through the second suction port 55.

In an implementation, the opening portion 110 may be disposed at an approximately central portion of the machine room 40 in the first direction A, or forward of the central portion of the machine room 40 in the first direction A.

Hereinafter, a discharge cover 90 of the cooking appliance 1 according to the disclosure will be described in detail.

Figure 8:
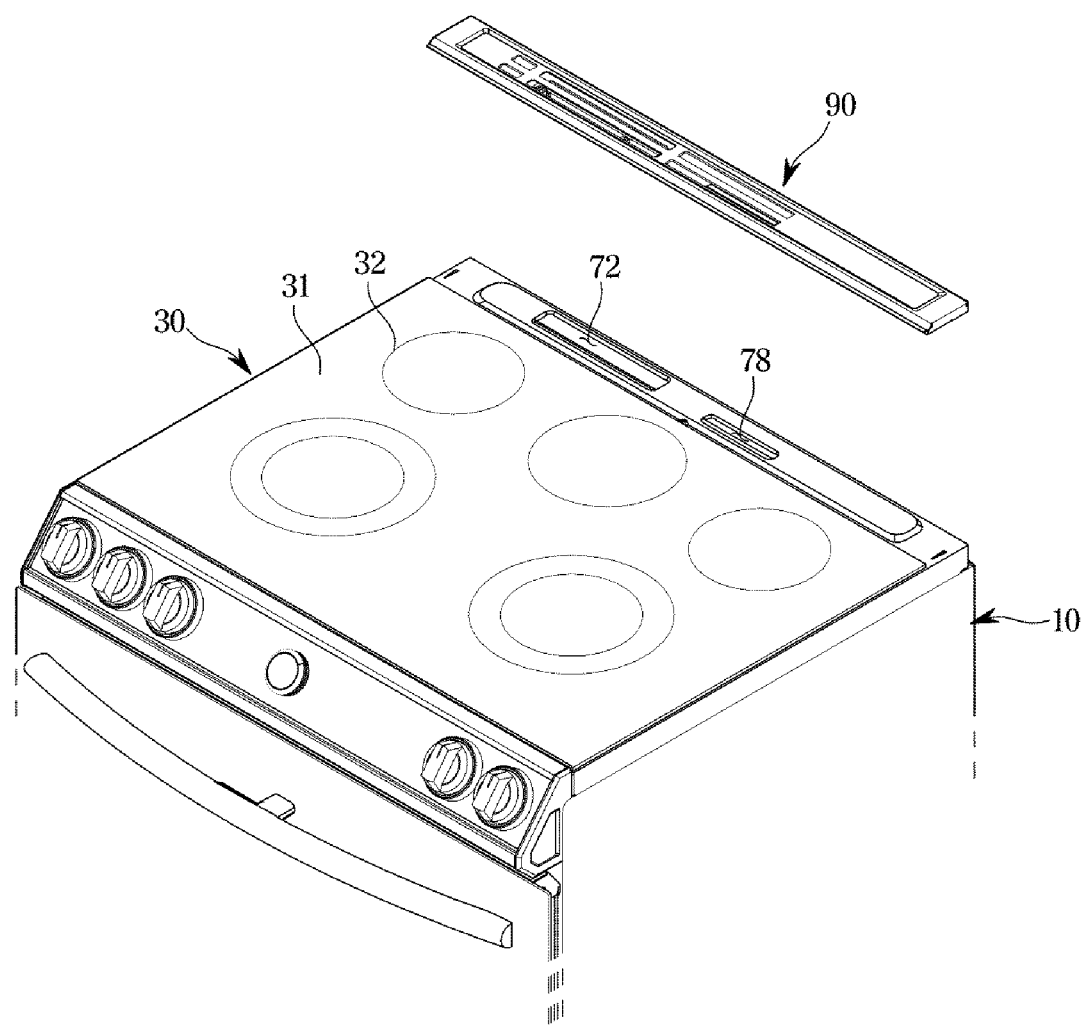
FIG. 8 is an exploded perspective view illustrating a state of the cooking appliance according to the embodiment of the disclosure in which a discharge cover is disassembled.
Figure 9:
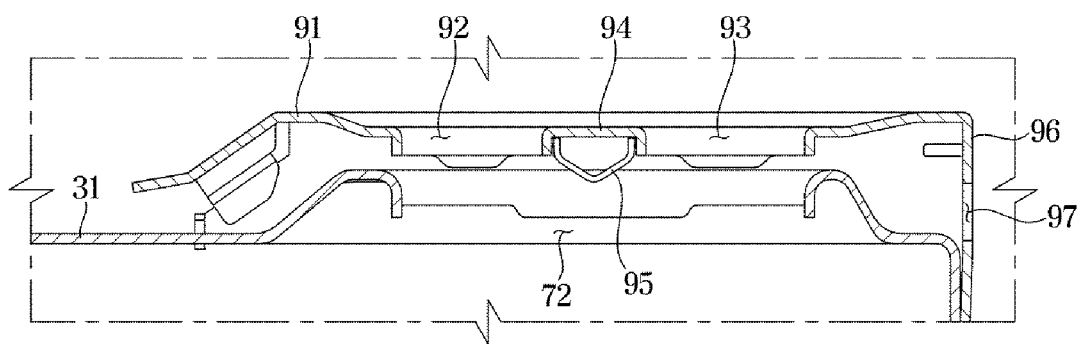
FIG. 9 is an enlarged view showing a portion of FIG. 3.
Figure 10:
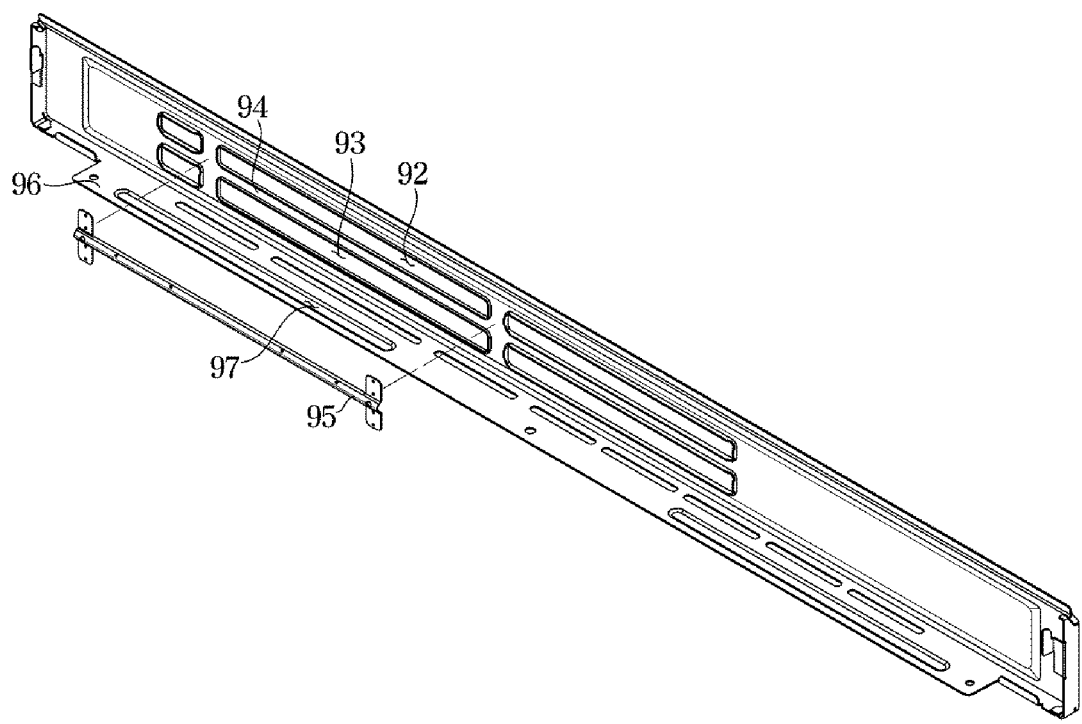
FIG. 10 is a view illustrating the discharge cover of the cooking appliance according to the embodiment of the disclosure, which is viewed from the rear side.

FIG. 8 is an exploded perspective view illustrating a state of the cooking appliance according to the embodiment of the disclosure in which a discharge cover is disassembled, FIG. 9 is an enlarged view showing a portion of FIG. 3, and FIG. 10 is a view illustrating a discharge cover of the cooking appliance according to the embodiment of the disclosure, which is viewed from the rear side.

Referring to FIGS. 8 to 10, the discharge cover 90 may be disposed at a rear side on the upper portion of the main body 10. In detail, the discharge cover 90 may be disposed behind the cooking surface 31.

The discharge cover 90 may be provided to correspond to the discharge port 72 in the upper side and lower side direction. The discharge port 72 may be disposed behind the cooking surface 31. Accordingly, the discharge cover 90 may be disposed behind the cooking surface 31 to correspond to the discharge port 72.

In addition, the discharge cover 90 may be disposed to correspond to the cooking chamber discharge port 78 in the upper side and lower side direction. According to an embodiment of the disclosure, the discharge port 72 and the cooking chamber discharge port 78 may be disposed adjacent to each other, so that both of the discharge port 72 and the cooking chamber discharge port 78 are covered by a single discharge cover 90.

However, the disclosure is not limited thereto, and when the discharge port 72 and the cooking chamber discharge port 78 are spaced apart from each other, the discharge cover 90 may be provided in a plurality of units thereof to cover the discharge port 72 and the cooking chamber discharge port 78.

In an implementation, the discharge port 72 and the cooking chamber discharge port 78 may be disposed on the rear side of the cooking appliance 1 to prevent hot air from being discharged directly to the user who uses the cooking appliance 1.

Accordingly, the discharge port 72, the cooking chamber discharge port 78, and the discharge cover 90 may be disposed on the rear side of the cooking surface 31.

The discharge cover 90 may be provided to cover the discharge port 72 and the cooking chamber discharge port 78 to prevent a part of the users body from being inserted into the discharge port 72 or the cooking chamber discharge port 78.

The following description will be made on a configuration of the discharge cover 90 disposed adjacent to the discharge port 72. Although the discharge cover 90 further includes a configuration disposed adjacent to the cooking chamber discharge port 78, the configuration is the same as that disposed adjacent to the discharge port 72 described below, and thus descriptions thereof will be omitted.

The discharge cover 90 includes a first through hole 92 provided so that air discharged from the discharge port 72 is discharged to the outside of the cooking appliance 1, a second through hole 93 disposed spaced apart from the first through hole 92, and an intermediate portion 94 disposed between the first through hole 92 and the second through hole 93.

The discharge cover 90 may include an upper surface 91 formed to face upward of the cooking appliance 1. The first through hole 92, the second through hole 93, and the intermediate portion 94 may be formed as a region of the upper surface 91.

The first and second through holes 92 and 93 may be formed to have an area smaller than or equal to the area of the discharge port 72. In an implementation, the area of the first and second through holes 92 and 93 may be provided smaller than the area of the discharge port 72, and the intermediate portion 94 disposed between the first and second through holes 92 and 93 may prevent a body part of a user from being inserted into the discharge port 72.

The upper surface 91 of the discharge cover 90 may be disposed in parallel with the cooking surface 31. As the upper surface 91 of the discharge cover 90 is arranged in parallel with the cooking surface 31, the sense of unity of the upper exterior of the cooking appliance 1 is increased, so that the aesthetic feeling of the cooking appliance 1 may be increased.

The color of the discharge cover 90 may be provided in a color substantially corresponding to the color of the cooking surface 31. Accordingly, the sense of unity of the cooking surface 31 and the discharge cover 90 may be further increased.

As the upper surface 91 of the discharge cover 90 is formed in parallel with the cooking surface 31, the intermediate portion 94 formed as a region of the upper surface 91 may also be formed in parallel with the cooking surface 31.

As described above, since the discharge port 72 is provided so as to be opened toward the upper side of the cooking appliance 1, and air discharged from the discharge port 72 flows upward, and the intermediate portion 94, which is arranged in a direction approximately perpendicular to the upward direction of the cooking appliance 1, may hinder the flow of air discharged from the discharge port 72

That is, when air discharged from the discharge port 72 flows in an upper side direction of the cooking appliance 1 and the air flows to the discharge cover 90 disposed on the upper side of the discharge port 72, a part of the air may easily pass through the discharge cover 90 through the through holes 92 and 93, but another part of the air may collide with the lower surface of the intermediate portion 94 formed perpendicular to the flow direction of air, so that the fluidity of air may be degraded.

In order to improve the fluidity of air passing through the discharge cover 90, the discharge cover 90 may include a discharge guide 95 disposed at a lower side of the intermediate portion 94 and guiding the air to the first and second through holes 92 and 93.

The discharge guide 95 may be provided to protrude downward from the lower side of the intermediate portion 94. In detail, the discharge guide 95 may be provided to have a curved surface that is convexly formed in a lower side direction of the cooking appliance 1.

Accordingly, the air flowing toward the lower surface of the intermediate portion 94 may collide with the discharge guide 95 to thereby be guided to the first and second through holes 92 and 93 along the curved surface of the discharge guide 95.

The discharge guide 95 may be detachably coupled to the upper surface 91 of the discharge cover 90.

The discharge cover 90 may be manufactured in a plate shape by a press method. The discharge cover 90 may be manufactured in a metal plate shape.

The discharge guide 95, which is provided in a protruding shape having a curved surface, may not be manufactured by a press method, but when the discharge guide 95 is provided to be detachably coupled to the upper surface 91 of the discharge cover 90, the discharge cover 90 may be easily manufactured by a press method, and only the discharge guide 95 may be additionally manufactured and combined to the discharge cover 90, thereby enhancing the manufacturing efficiency of the discharge cover 90.

The discharge cover 90 may include a rear surface 96 extending downward from the rear end of the upper surface 91. The rear surface 96 may be formed with an additional through hole 97 formed to allow air discharged from the discharge port 72 to additionally pass through the discharge cover 90.

The additional through hole 97 may be provided to increase the flow efficiency of air that has failed to pass through the discharge cover 90 through the first and second through holes 92 and 93.

The additional through hole 97 may be opened rearward of the cooking appliance 1. Accordingly, air may be prevented from being directly discharged to a user who uses the cooking appliance 1 in front of the cooking appliance 1.

Hereinafter, the cooking chamber 20 will be described in detail.

Figure 11:
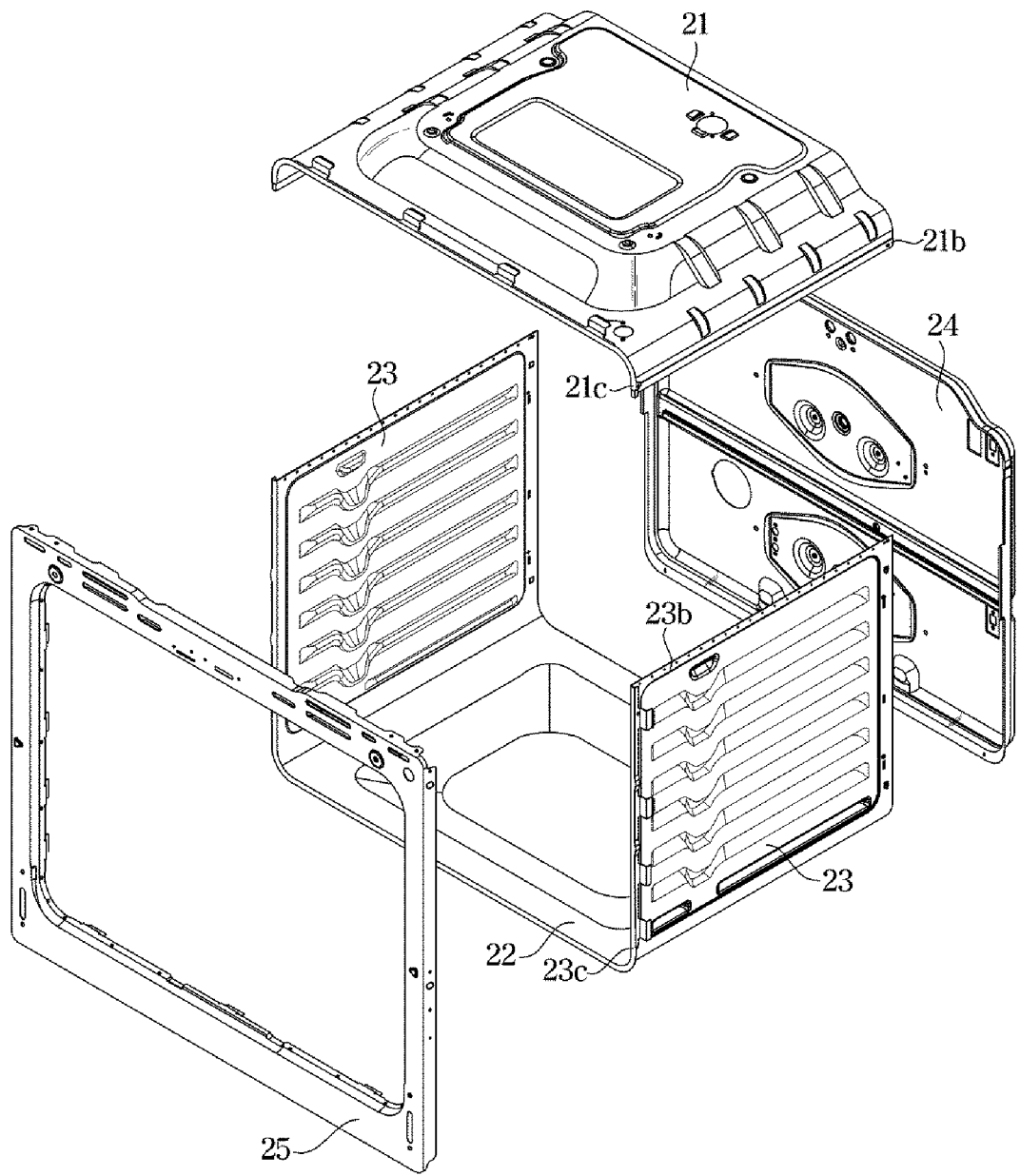
FIG. 11 is a view illustrating a state of the cooking appliance according to the embodiment of the disclosure before the cooking chamber is assembled.
Figure 12:
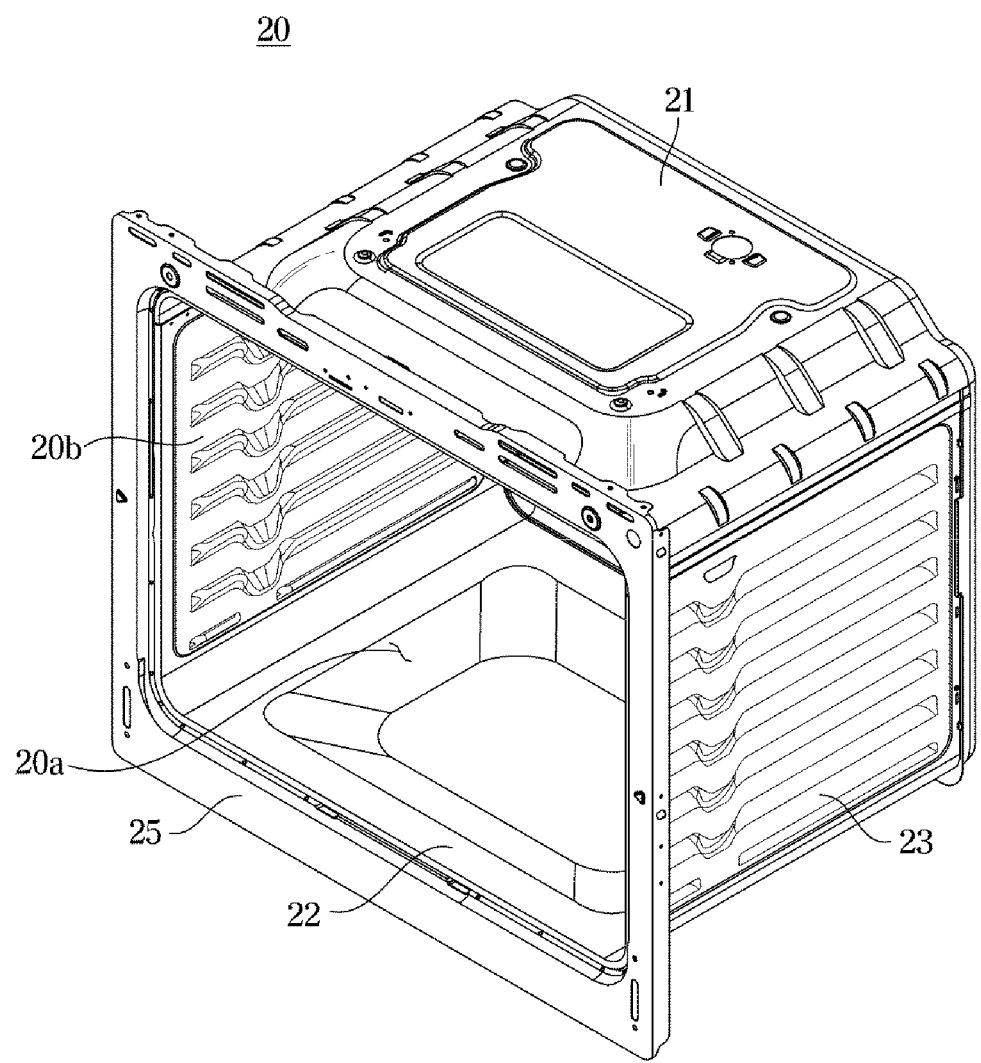
FIG. 12 is a perspective view illustrating the cooking chamber of the cooking appliance according to the embodiment of the disclosure.
Figure 13:
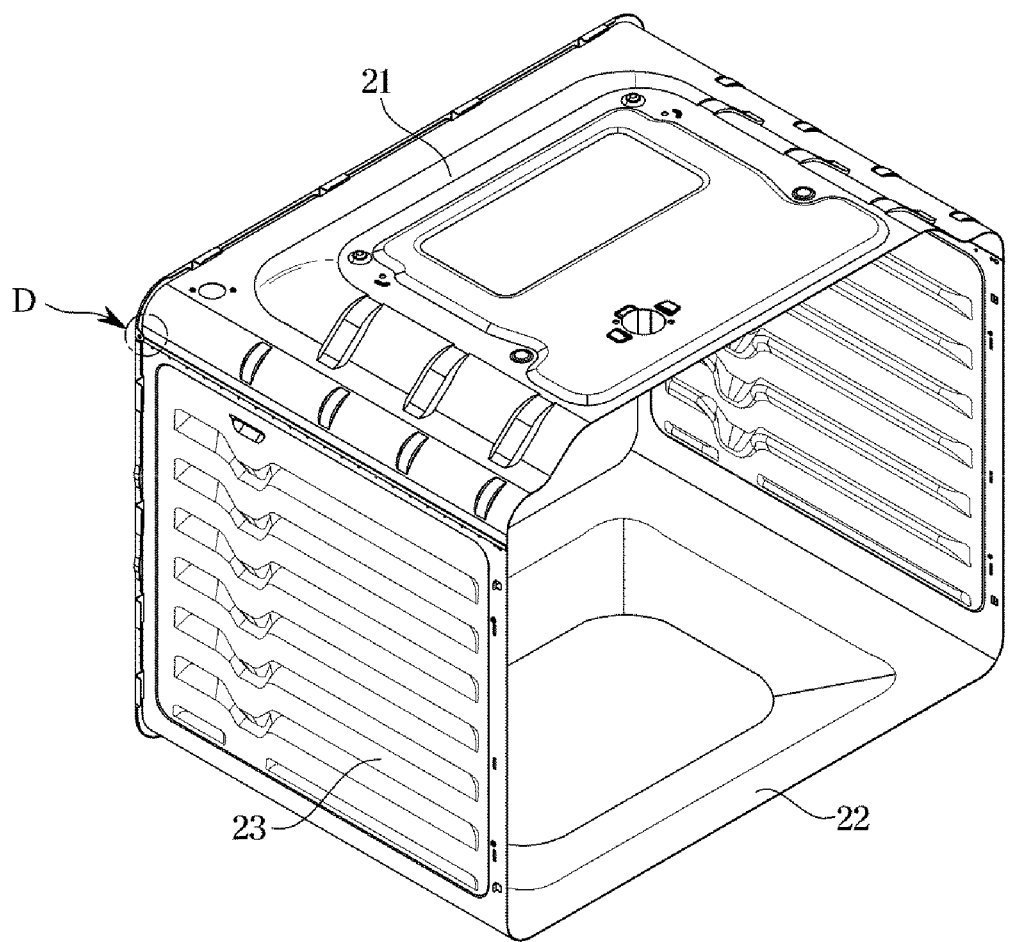
FIG. 13 is a view illustrating an example of the cooking appliance according to the embodiment, which shows coupling of some parts of the cooking chamber.
Figure 14:
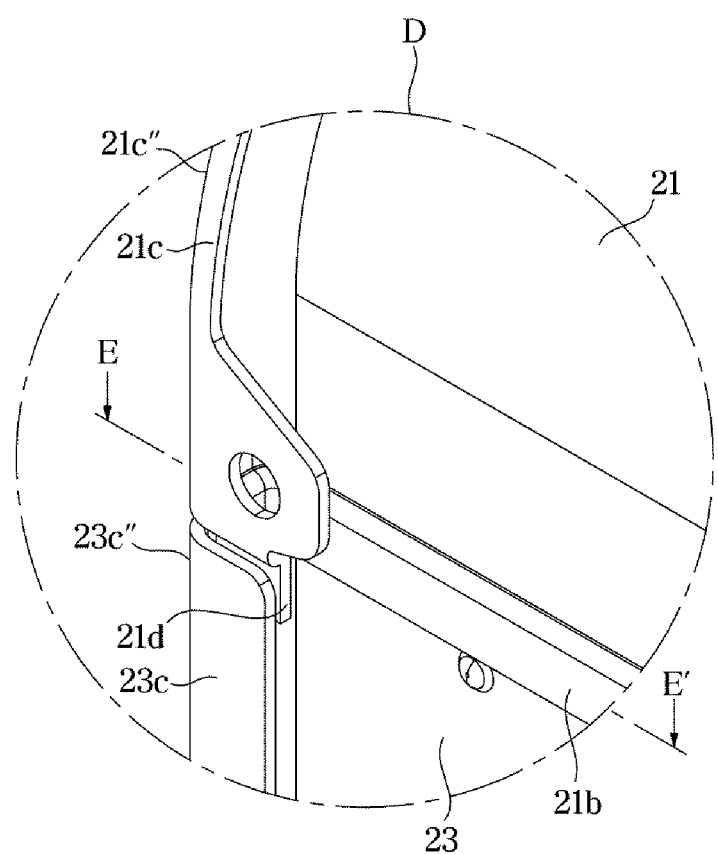
FIG. 14 is an enlarged view showing a portion of FIG. 13.
Figure 15:
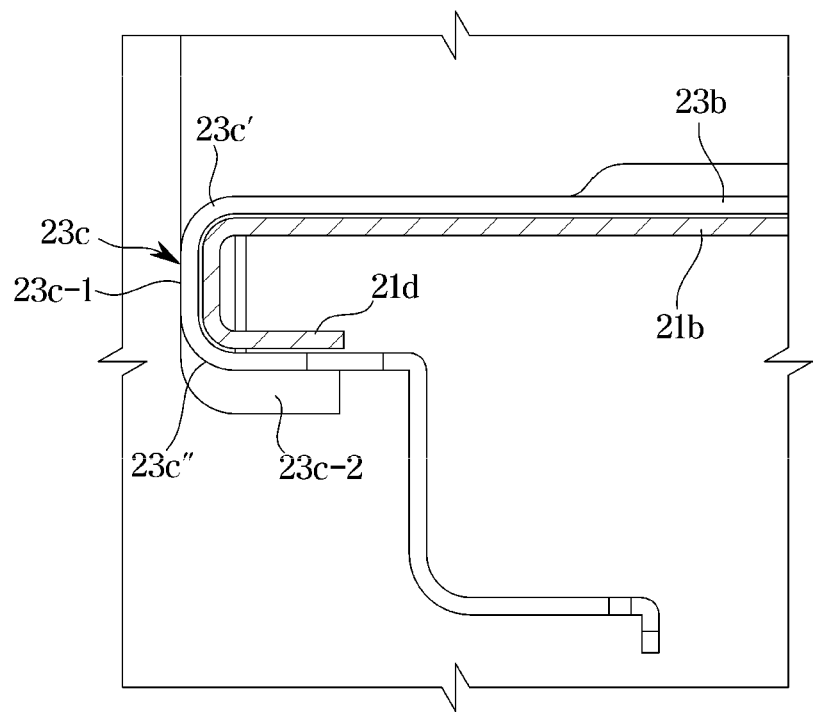
FIG. 15 is a view showing a cross section of FIG. 14.

FIG. 11 is a view illustrating a state of the cooking appliance according to the embodiment of the disclosure before the cooking chamber is assembled, FIG. 12 is a perspective view illustrating the cooking chamber of the cooking appliance according to the embodiment of the disclosure, FIG. 13 is a view illustrating an example of the cooking appliance according to the embodiment which shows coupling of some parts of the cooking chamber, FIG. 14 is an enlarged view showing a portion of FIG. 13, and FIG. 15 is a view showing a cross section of FIG. 14.

The cooking chamber 20 of the cooking appliance 1 may be provided in an approximately rectangular parallelepiped shape having an opening with a large-capacity. The cooking chamber 20 may be formed of a metal material.

Due to having the large-capacity rectangular parallelepiped shape, the cooking chamber 20 is not easily manufactured in a unitary body.

Accordingly, the cooking chamber 20 may be formed by manufacturing a plurality of components as shown in FIG. 11, and welding the plurality of components to each other in a single unit as shown in FIG. 12.

That is, the top plate 21, the bottom plate 22, the both side plates 23, the rear plate 24, and the front plate 25 of the cooking chamber 20 are individually manufactured and then welded to form an integral cooking chamber 20.

According to an embodiment of the disclosure, the side plates 23 may be integrally manufactured with the bottom plate 22a, but the disclosure is not limited thereto, and the side plates 23 and the bottom plate 22 may be separately manufactured and welded to each other.

When the components are welded to form the integral cooking chamber 20, the cooking chamber 20 may include a cooking chamber inside 20a having a front side that is open.

The cooking chamber 20 may include an enamel coating 20b formed on a region forming the cooking chamber inside 20a.

The enamel coating 20b may be formed in a region forming the cooking chamber inside 20a in the top plate 21, the bottom plate 22, the both side plates 23, and the rear plate 24 of the cooking chamber 20.

The enamel coating 20b improves heat retention in the cooking chamber inside 20a and prevents the cooking chamber 20 from being oxidized at a high temperature or being corroded by combustion gases.

The cooking chamber 20 is formed by welding the components 21, 22, 23, and 25 as described above, but when an external force is exerted on the cooking chamber 20, welded portions of the components 21, 22, 23, and 25 may be deformed due to weak stiffness.

The cooking chamber 20 formed of a metal material is not damaged even when deformation occurs, but the enamel coating 20b coated on the cooking chamber inside 20a may be damaged.

That is, when an external force is exerted on the cooking chamber 20, regions of the enamel coating 20b coated on the welded portions of the components 21, 22, 23, and 25 may be damaged.

In particular, when an external force is exerted on the cooking chamber 20, the external force is concentrated on a welded portion D at front ends of the top plate 21 and the both side plates 23, and a region of the enamel coating 20b coated on the welded portion D at the front ends of the top plate 21 and the both side plates 23 may be likely to be damaged.

The cooking appliance 1 according to the embodiment of the disclosure may include a reinforcing portion 21d provided to further secure the stiffness of the welded portion D at the front ends of the top plate 21 and the both side plates 23.

The top plate 21 may include a top plate welding portion 21b disposed to overlap the both side plates 23 in the upper side and lower side direction to be welded to the both side plates 23.

The both side plates 23 may include side plate welding portions 23b that are disposed to overlap the top plate 21 in the upper side and lower side direction so as to be welded to the top plate 21.

The top plate welding portion 21b of the top plate 21 may be provided to extend further downward compared to the lower end of the top plate 21. Accordingly, the top plate welding portion 21b may be disposed to overlap the both side plates 23 in the upper side and lower side direction.

The side plate welding portions 23b of the both side plates 23 may be disposed at positions corresponding to the top plate welding portion 21b in the upper side and lower side direction. Accordingly, the side plate welding portions 23b and the top plate welding portion 21b may be welded to each other to form a unitary body.

The top plate 21 may include a top plate bent portion 21c that is formed by being bent to perpendicular to the forward direction. The top plate bent portion 21c may include a first bent (not shown) that is formed by being bent to be perpendicular to the top plate 21 that extends in the front side and rear side direction and a second bent 21c" that is formed by being bent from the first bent (not shown) to be perpendicular to the first bent (not shown) to extend in the front side and rear side direction.

Accordingly, the top plate bent portion 21c may be provided in a shape including the first bent (not shown) bent at the front end of the top plate 21 and laterally extending outside the top plate 21 and then the second bent 21c" bent from the first bent (not shown) in the rear side direction.

The both side plates 23 may include side plate bent portions 23c that are formed by being bent in a direction perpendicular to the forward direction. The side plate bent portion 23c includes a first bent 23c' that is formed by being bent to be perpendicular to the both side plates 23 that extends in the front side and rear side direction and a second bent 23c" formed by being bent from the first bent 23c' to be perpendicular to the front side and rear side direction.

Accordingly, the side plate bent portion 23c may be provided in a shape including the first bent 23c' that is formed by being bent in the left side and right side direction from the front ends of the both side plates 23 and the second bent 23c" formed by being bent from the first bent 23c' in the rear side direction.

The top plate bent portion 21c and the side plate bent portion 23c may be disposed in front of the top plate welding portion 21b and the side plate welding portion 23b, respectively.

The top plate bent portion 21c and the side plate bent portion 23c may be provided so as not to overlap each other in the upper side and lower side direction. The top plate bent portion 21c may be provided to be disposed on the upper end of the side plate bent portion 23c.

The top plate 21 and the both side plates 23 may be welded to each other a region behind the top plate bent portion 21c and the side plate bent portion 23c in the front side and rear side direction and a region around a middle portion between the top plate bent portion 21c and the side plate bent portion 23c in the upper side and lower side direction.

Accordingly, the stiffness of the region behind the top plate bent portion 21c and the side plate bent portion 23c in the front side and rear side direction and the region around the middle portion between the top plate bent portion 21c and the side plate bent portion 23c in the upper side and lower side direction may be lower than that of other positions of the cooking chamber 20.

The top plate 21 may include a reinforcing portion 21d that may additionally secure the stiffness of the region behind the top plate bent portion 21c and the side plate bent portion 23c in the front side and rear side direction and the region around the middle portion between the top plate bent portion 21c and the side plate bent portion 23c in the upper side and lower side direction.

The reinforcing portion 21d may be provided to be welded to the both side plates 23 together with the top plate welding portion 21b.

The reinforcing portion 21d may be provided to extend downward from the lower end of the top plate bent portion 21c.

Accordingly, the reinforcing portion 21d may be disposed to come in contact with the side plate bent portion 23c disposed below the top plate bent portion 21c.

The reinforcing portion 21d may extend downward by a length approximately corresponding to a length in which the top plate welding portion 21b extends downward.

The reinforcing portion 21d may extend while having bents corresponding to the first bent (not shown) and the second bent 21c" of the top plate bent portion 21c. Accordingly, the reinforcing portion 21d may be provided to come in contact with the rear side of the side plate bent portion 23c as a whole.

In detail, the reinforcing portion 21d may extend at a rear side a first portion 23c-1, which extends outward from the first bent 23c' of the side plate bent portion 23c in the left side and right side direction, so as to correspond to the first portion 23c-1.

The reinforcing portion 21d may be bent at a rear side of the second bent 23c, which is bent at an end portion of the first portion 23c-1 of the side plate bent portion 23c, so as to correspond to the second bent 23c.

The reinforcing portion 21d may extend at a lateral side of a second portion 23c-2, which extends rearward from the second bent 23c" of the side plate bent portion 23c, so as to correspond to the second portion 23c-2.

Accordingly, the reinforcing portion 21d is disposed to come in contact with the side plate bent portion 23c as a whole, and the reinforcing portion 21d while in contact with the side plate bent portion 23c may be welded to the both side plates 23 together with the top plate welding portion 21b.

As the reinforcing portion 21d is additionally welded to the both side plates 23, the reinforcing portion 21d is caused to be welded at a region having a weak stiffness, that is, the region behind the top plate bent portion 21c and the side plate bent portion 23c in the front side and rear side direction and the region around the middle portion between the top plate bent portion 21c and the side plate bent portion 23c in the upper side and lower side direction, so that the stiffness of the weak region may be secured.

Accordingly, the enamel coating coated on the region behind the top plate bent portion 21c and the side plate bent portion 23c in the front side and rear side direction and the region around the middle portion between the top plate bent portion 21c and the side plate bent portion 23c in the upper side and lower side direction may be prevented from being damaged.

As is apparent from the above, the cooking appliance can be provided with improved air fluidity at an upper portion of a case for efficient cooling of electric components disposed on the upper portion of the case.

The cooking appliance can be provided with an enhanced aesthetic sense by improving the shape of a discharge portion through which air flowing from an upper portion of a case is discharged.

The cooking appliance can secure the stiffness of a cooking chamber by improving a welding structure of the cooking chamber, and improve the quality of enamel on the cooking chamber.

Although few embodiments of the disclosure have been shown and described, the above embodiment is illustrative purpose only, and it would be appreciated by those skilled in the art that changes and modifications may be made in these embodiments without departing from the principles and scope of the disclosure, the scope of which is defined in the claims and their equivalents.

What is claimed is:

1. A cooking appliance comprising:
   a main body arranged with a machine room;
   a cooking chamber arranged below the machine room;
   an intermediate flow path including a first suction port, the intermediate flow path being formed between the machine room and the cooking chamber; and
   a fan configured to suction air into the intermediate flow path,
   wherein the machine room includes:
      a second suction port through which air is suctioned,
      an opening portion through which air is introduced toward the intermediate flow path, the opening portion includes a first opening portion and a second opening portion through which the air is introduced toward the intermediate flow path, and
      wherein the second opening portion is arranged at a farther distance from the fan than the first opening portion and the second opening portion has an area larger than an area of the first opening portion.

2. The cooking appliance of claim 1, wherein air is introduced into the machine room through the second suction port to flow into the intermediate flow path through the first opening portion and the second opening portion.

3. The cooking appliance of claim 1, further comprising:
   a partition plate configured to divide the machine room from the intermediate flow path along an upper side and a lower side direction of the main body,
   wherein the first opening portion and the second opening portion are formed at the partition plate.

4. The cooking appliance of claim 3, wherein the partition plate has an upper surface that forms a lower portion of the machine room and has a lower surface that forms an upper portion of the intermediate flow path.

5. The cooking appliance of claim 1, wherein a flow area of air in the intermediate flow path is provided to increase and decrease in a second direction perpendicular to a first direction along which the first suction port is formed, and the second opening portion is formed on a region in which the flow area of air in the intermediate flow path decreases along the first direction.

6. The cooking appliance of claim 5, wherein the first opening portion is formed on a region in which the flow area of air in the intermediate flow path is constant along the first direction.

7. The cooking appliance of claim 6, wherein the fan is arranged on the region in which the flow area of air in the intermediate flow path is constant along the first direction.

8. The cooking appliance of claim 1, wherein the intermediate flow path is along a first region and a second region partitioned from each other in a second direction perpendicular to a first direction in which the first suction port is formed,
   a flow area of air in the first region is provided to be larger than a flow area of air in the second region, and
   the fan is arranged on the first region.

9. The cooking appliance of claim 8, wherein the first opening portion is arranged on the first region, and the second opening portion is arranged on the second region.

10. The cooking appliance of claim 8, wherein the first region and the second region are divided with respect to a center of the intermediate flow path, and an inclination angle of a sidewall of the first region forming the first region with respect to the first direction is smaller than an inclination angle of a sidewall of the second region forming the second region with respect to the first direction.

11. The cooking appliance of claim 1, wherein the first suction port has a suction area larger than a suction area of the second suction port.

12. The cooking appliance of claim 1, further comprising an upper side cooking portion arranged above the machine room,
   wherein the upper side cooking portion includes a cooking surface on which a cooking object is to be placed and a heating device arranged in the machine room, and
   the first opening portion and the second opening portion are arranged such that heat generated from the heating device is provided to flow out of the machine room together with air suctioned through the second suction port.

13. The cooking appliance of claim 12, further comprising:
   a discharge port that is open upward to discharge air moved by the fan,
   a discharge cover that covers the discharge port, the discharge cover including an upper surface arranged parallel to the cooking surface.

14. The cooking appliance of claim 13, wherein the discharge cover includes:
   a first through hole and a second through hole through which air discharged from the discharge port passes in an upward direction,
   an intermediate portion formed between the first through hole and the second through hole, and
   a discharge guide arranged below the intermediate portion to guide air to the first through hole and the second through hole.

15. The cooking appliance of claim 13, wherein the discharge cover includes:
   a rear surface which extends downward from a rear end of the upper surface of the discharge port and an additional through hole arranged in the rear surface and formed to allow air discharged from the discharge port to pass therethrough.

16. A cooking appliance comprising:
   a main body arranged with a machine room having a first suction port;
   a cooking chamber arranged below the machine room;
   an intermediate flow path including a second suction port, the intermediate flow path being formed between the machine room and the cooking chamber; and
   a partition plate configured to divide the intermediate flow path from the machine room,
   wherein the partition plate includes:
      an opening portion through which air flows between the machine room and the intermediate flow path, the opening portion includes a first opening portion and a second opening portion through which air flows between the machine room and the intermediate flow path, and
      wherein the second opening portion is arranged at a farther distance from a front of the intermediate flow path than the first opening portion and the second opening portion has an area larger than an area of the first opening portion.

17. The cooking appliance of claim 16, further comprising:

a fan arranged on the intermediate flow path and configured to suction air into the intermediate flow path.

18. The cooking appliance of claim 17, wherein a flow area of air in the intermediate flow path is provided to increase or decrease in a second direction perpendicular to a first direction along which the first suction port is formed, and the second opening portion is formed on a region in which the flow area of air in the intermediate flow path decreases along the first direction.

19. The cooking appliance of claim 18, wherein the first opening portion is formed on a region in which the flow area of air in the intermediate flow path is constant along the first direction.

20. A cooking appliance comprising:
a main body arranged with a machine room;
a cooking chamber arranged below the machine room;
an intermediate flow path including a first suction port, the intermediate flow path being formed between the machine room and the cooking chamber; and
a fan configured to suction air into the intermediate flow path,
wherein the machine room includes:
    a second suction port through which air is suctioned, and
    a first opening portion and a second opening portion through which air is introduced toward the intermediate flow path,
wherein the intermediate flow path includes a first region and a second region partitioned from each other in a second direction perpendicular to a first direction along which the first suction port is formed,
a flow area of air in the first region is provided to be larger than a flow area of air in the second region,
wherein the first opening portion is arranged on the first region and the second opening portion arranged on the second region, and the second opening portion has an area larger than an area of the first opening portion.

* * * * *